United States Patent
Masuda (10) Patent No.: US 10,081,345 B2
(45) Date of Patent: Sep. 25, 2018

(54) ELECTRIC BRAKE SYSTEM

(71) Applicant: NTN CORPORATION, Osaka-shi, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/800,656

(22) Filed: Nov. 1, 2017

(65) Prior Publication Data

US 2018/0065607 A1 Mar. 8, 2018

Related U.S. Application Data

(63) Continuation of application No. PCT/JP2016/063606, filed on May 2, 2016.

(30) Foreign Application Priority Data

May 7, 2015 (JP) .................................. 2015-094834

(51) Int. Cl.
*G06F 7/70* (2006.01)
*B60T 8/88* (2006.01)
(Continued)

(52) U.S. Cl.
CPC .............. *B60T 8/885* (2013.01); *B60T 8/172* (2013.01); *B60T 8/321* (2013.01); *B60T 8/58* (2013.01);
(Continued)

(58) Field of Classification Search
CPC .......... B60T 8/885; B60T 8/172; B60T 8/321; B60T 8/58; B60T 13/741; B60T 2220/04; B60T 2270/414
(Continued)

(56) References Cited

U.S. PATENT DOCUMENTS 3,454,909 A * 7/1969 Koehler .................... G04F 3/06
335/65
6,748,310 B2 6/2004 Tamasho et al.
(Continued)

FOREIGN PATENT DOCUMENTS

JP 6-327190 11/1994
JP 2003-194119 7/2003
(Continued)

OTHER PUBLICATIONS

Decision of Grant issued Nov. 1, 2016 on corresponding Japanese Application No. 2015-094834.
(Continued)

*Primary Examiner* — Shardul D Patel (57) ABSTRACT

An electric brake system includes a plurality of electric brake devices. A control device of each electric brake device includes: an abnormality determination section that determines whether there is abnormality in supply of power from a power supply device to the electric brake device; and a redundant function control section that, when the abnormality determination section has determined that there is abnormality in supply of power, controls the braking force by using an auxiliary power supply in accordance with a predetermined condition. The redundant function control section controls the braking force by using the auxiliary power supply at least when a desired braking force cannot be output even with all the electric brake devices for which the abnormality determination section has determined that there is no abnormality in supply of power, as the predetermined condition.

5 Claims, 8 Drawing Sheets

(51) Int. Cl.
*B60T 8/172* (2006.01)
*B60T 13/74* (2006.01)
*B60T 8/58* (2006.01)
*B60T 8/32* (2006.01)

(52) U.S. Cl.
CPC ......... *B60T 13/741* (2013.01); *B60T 2220/04* (2013.01); *B60T 2270/414* (2013.01)

(58) Field of Classification Search
USPC ......... 701/70, 36; 290/4 R; 303/20; 320/166
See application file for complete search history.

(56) References Cited

U.S. PATENT DOCUMENTS

| | | | | |
|---|---|---|---|---|
| 7,810,616 | B2* | 10/2010 | Nakazeki | F16D 65/18 188/158 |
| 2003/0125863 | A1* | 7/2003 | Tamasho | B60T 13/741 701/70 |
| 2003/0233179 | A1* | 12/2003 | Matsubara | B60T 8/885 701/36 |
| 2008/0110704 | A1* | 5/2008 | Nakazeki | F16D 65/18 188/158 |
| 2009/0102434 | A1* | 4/2009 | Nakajima | H02J 7/345 320/166 |

FOREIGN PATENT DOCUMENTS

| | | |
|---|---|---|
| JP | 2004-322987 | 11/2004 |
| JP | 2006-194356 | 7/2006 |
| WO | 2007/063865 A1 | 6/2007 |

OTHER PUBLICATIONS

International Search Report dated Jul. 12, 2016 in corresponding International Patent Application PCT/JP2016/063606.
English Language Translation of International Preliminary Report on Patentability dated Nov. 16, 2017 in corresponding International Patent Application No. PCT/JP2016/063606.

* cited by examiner

Fig. 8

ELECTRIC BRAKE SYSTEM

CROSS REFERENCE TO THE RELATED APPLICATION

This application is a continuation application, under 35 U.S.C. § 111(a), of international application No. PCT/JP2016/063606, filed May 2, 2016, which is based on and claims Convention priority to Japanese patent application No. 2015-094834, filed May 7, 2015, the entire disclosure of which is herein incorporated by reference as a part of this application.

BACKGROUND OF THE INVENTION

Field of the Invention

The present invention relates to an electric brake system including a plurality of electric brake devices, and particularly to a technique that can provide a redundant function and ensure a mounting space for an auxiliary power supply through a limited use of the auxiliary power supply.

Description of Related Art

Regarding electric brake devices, the following techniques have been proposed.

1. A technique of converting rotary motion of a motor into linear motion through a linear motion mechanism, by stepping on a brake pedal, to press a brake pad against a brake disc and bring the brake pad into contact with the brake disc, thereby applying a braking force (Patent Document 1).

2. An electric linear actuator in which a planetary roller screw mechanism is used (Patent Document 2).

RELATED DOCUMENT

Patent Document

[Patent Document 1] JP Laid-open Patent Publication No. H06-327190

[Patent Document 2] JP Laid-open Patent Publication No. 2006-194356

For electric brake systems in which electric brake devices are used as in Patent Documents 1 and 2, an improvement in power supply system redundancy is a significant issue. Mainly, there are two possible methods to solve this issue: one is to provide an auxiliary power supply separate from a main power supply, and the other is to multiplex a transmission system from the main power supply. As for multiplexing of the transmission system, in general, a thicker harness may be required to ensure the rated motor current of the electric brake devices, so that it may be difficult to multiplex the transmission system in terms of an increased number of assembly process, a cost issues for the harness, and a wiring space.

On the other hand, in the case of providing the auxiliary power supply separate from the main power supply, a complete redundant power supply system can be configured on a brake caliper of a disk brake by providing a motor, a control device for the motor, and an auxiliary power supply all on the brake caliper, for example. In general, the main power supply of a vehicle is often formed by a battery with a high energy density, which may pose the problems of a low resistance to charge/discharge cycles, a low current density during charge/discharge, etc. For example, these problems can be expected to be solved by forming the auxiliary power supply by a capacitor. However, in the case of using the auxiliary power supply, the mounting space for the auxiliary power supply may be limited, which may make it difficult to store a large amount of energy.

SUMMARY OF THE INVENTION

It is an object of the present invention to provide an electric brake system that is provided with a power supply system redundancy and can increase the degree of freedom in the mounting space for components thereof.

Hereinafter, in order to facilitate understanding of the present invention, the present invention will be described with reference to the reference numerals in embodiments for the sake of convenience.

An electric brake system according to the present invention includes a plurality of electric brake devices, the electric brake devices each including a brake rotor 8, a friction member 9 that is to be brought into contact with the brake rotor 8, a friction member operator 6 configured to bring the friction member 9 into contact with the brake rotor 8, an electric motor 4 that drives the friction member operator 6, and a control device 2 that controls a braking force by controlling the electric motor 4, wherein a main power supply device 3 that supplies power to the respective electric motors 4 and the respective control devices 2 included in the electric brake devices is provided, and each of the electric brake devices is provided with an auxiliary power supply 18 that stores therein power supplied from the main power supply device 3 and supplementarily supplies power to at least the electric motor 4 of the electric brake device, each of the control devices 2 of the electric brake devices includes:

an abnormality determination section 26 that determines whether there is abnormality in supply of power from the power supply device to the electric brake device; and a redundant function control section 27 that, when the abnormality determination section 26 has determined that there is abnormality in supply of power from the power supply device 3 to the electric brake device, controls the braking force by using the auxiliary power supply 18 in accordance with a predetermined condition, the redundant function control section 27 controls the braking force by using the auxiliary power supply 18 when at least a basic condition is satisfied as the predetermined condition, the basis condition being a condition that a desired braking force cannot be output even with all the electric brake devices for which the abnormality determination section 26 has determined that there is no abnormality in supply of power.

The "desired braking force" is an actual braking force that is output in accordance with the braking force required by an operator of the vehicle. Each of the "predetermined condition" and the "desired braking force " is determined on the basis of the result of an experiment, simulation, or the like.

With this configuration, normally, the main power supply device 3 supplies power to the electric motor 4 and the control device 2. In a state in which the power is supplied, the control device 2 controls the electric motor 4 so as to provide an appropriate braking force in accordance with, for example, an instruction from a host control device 17. At this time, power from the main power supply device 17 is supplied to and stored in the auxiliary power supply 18.

The abnormality determination section 26 determines whether there is abnormality in supply of power from the power supply device 3 to the electric brake device. When the abnormality determination section 26 has determined that there is abnormality in supply of power to the electric brake device, the redundant function control section 27 controls the braking force by using the auxiliary power supply 18 in accordance with the predetermined condition.

The redundant function control section 27 controls the braking force by using the auxiliary power supply 18 when at least a basic condition is satisfied as the predetermined condition. The basic condition is a condition that a desired braking force cannot be output even with all the electric brake devices for which the abnormality determination section 26 has determined that there is no abnormality in supply of power. By providing the auxiliary power supply 18 in addition to the main power supply device 3 in the electric brake system in this manner, it is possible to achieve a redundant function of the power supply system, compared with the electric brake system including no auxiliary power supply.

Furthermore, the use of the auxiliary power supply 18 is limited to a case where the function of the electric brake system as a whole is reduced to a level lower than a predetermined level. Accordingly, a battery smaller than a battery commonly used for a vehicle, or a capacitor can be adopted as the auxiliary power supply 18, for example. Because of the limited use of the auxiliary power supply 18, it is possible to achieve a size reduction for the auxiliary power supply 18, and increase the degree of freedom in the mounting space of the auxiliary power supply 18 to the vehicle. Consequently, it is possible to increase the degree of freedom in design.

The redundant function control section 27 may use the auxiliary power supply 18 such that the turning acceleration of a vehicle equipped with the electric brake system is less than or equal to a predetermined value, as the predetermined condition, in addition to that the basic condition that a desired braking force cannot be output even with all the electric brake devices for which the abnormality determination section has determined that there is no abnormality in supply of power, in other words, the basic condition that the deceleration in a front-rear direction caused by all the electric brake devices for which it is determined that there is no abnormality is less than or equal to a threshold, is at least satisfied.

Each of the "predetermined value" and the "threshold" is determined on the basis of the result of an experiment, simulation, or the like.

When the braking force required by the operator of the vehicle is increased, for example, when a brake pedal or brake instruction device 19 is strongly depressed in a state in which the abnormality determination section 26 has determined that there is abnormality in supply of power to the electric brake device corresponding to any one of a plurality of wheels, a sufficient braking force may not be provided by only the other electric brake devices. By using the auxiliary power supply 18 in this case, it is possible to achieve a desired braking force corresponding to the required braking force. To ensure the stability of the vehicle attitude, it is preferable in this case that the auxiliary power supply 18 is used such that the turning acceleration of the vehicle is less than or equal to the predetermined value.

The redundant function control section 27 may change a threshold of deceleration in a front-rear direction on the basis of a correlation in which the threshold of deceleration in the front-rear direction increases with an increase in a value of a braking force required by an operator of the vehicle. By changing the threshold of deceleration in the front-rear direction in this manner, the frequency of use of the auxiliary power supply 18 can be limited in detail.

A vehicle speed estimator 30 configured to estimate a traveling speed of a vehicle or vehicle speed equipped with the electric brake system may be provided, and the redundant function control section 27 may use the auxiliary power supply 18 when, in addition to that the basic condition is satisfied, a condition that the vehicle speed estimated by the vehicle speed estimator 30 is greater than or equal to a predetermined vehicle speed is satisfied as the predetermined condition.

The "predetermined vehicle speed" is determined on the basis of the result of test, simulation, or the like.

Even when the abnormality determination section 26 determines that there is abnormality in supply of power to the electric brake device corresponding to any one of the wheels, no turning acceleration occurs to the vehicle, for example, when the vehicle is in a stopped state or at stoppage. Therefore, the auxiliary power supply 18 is used when a condition that the vehicle speed estimated by the vehicle speed estimator 30 is greater than or equal to the predetermined vehicle speed is satisfied. By using the auxiliary power supply 18 in a limited manner in this way, it is possible to achieve a size reduction for the auxiliary power supply 18.

The redundant function control section 27 of the electric brake device for which it is determined that there is abnormality in supply of power may determine whether or not to use power of the auxiliary power supply 18, on the basis of sensing information of all the electric brake devices for which there is no abnormality in supply of power.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
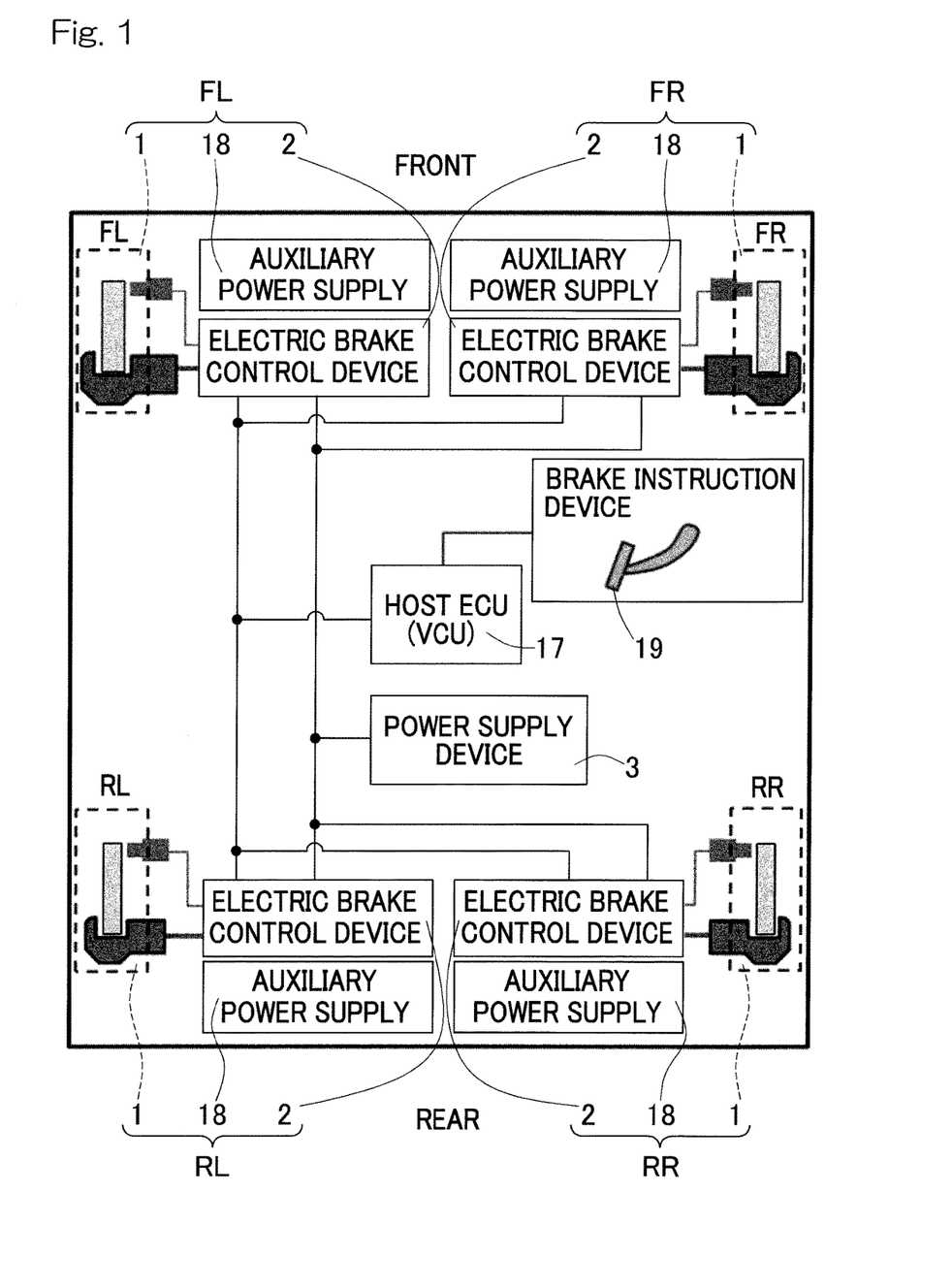
FIG. 1 is a diagram showing, in plan view, a configuration example in which an electric brake system according to an embodiment of the present invention is mounted to a vehicle.

An electric brake system according to an embodiment of the present invention will be described with reference to FIGS. 1 to 7. As shown in FIG. 1, the electric brake system includes a plurality of electric brake devices FL, FR, RL, and RR, a main power supply device 3, and a host ECU 17. Each of the electric brake devices FL, FR, RL, and RR includes an electric brake actuator 1, a control device 2, and an auxiliary power supply 18. In this example, control devices 2 respectively corresponding to the wheels of a four-wheeled vehicle are provided. The electric brake actuator 1 will be described first.

Figure 2:
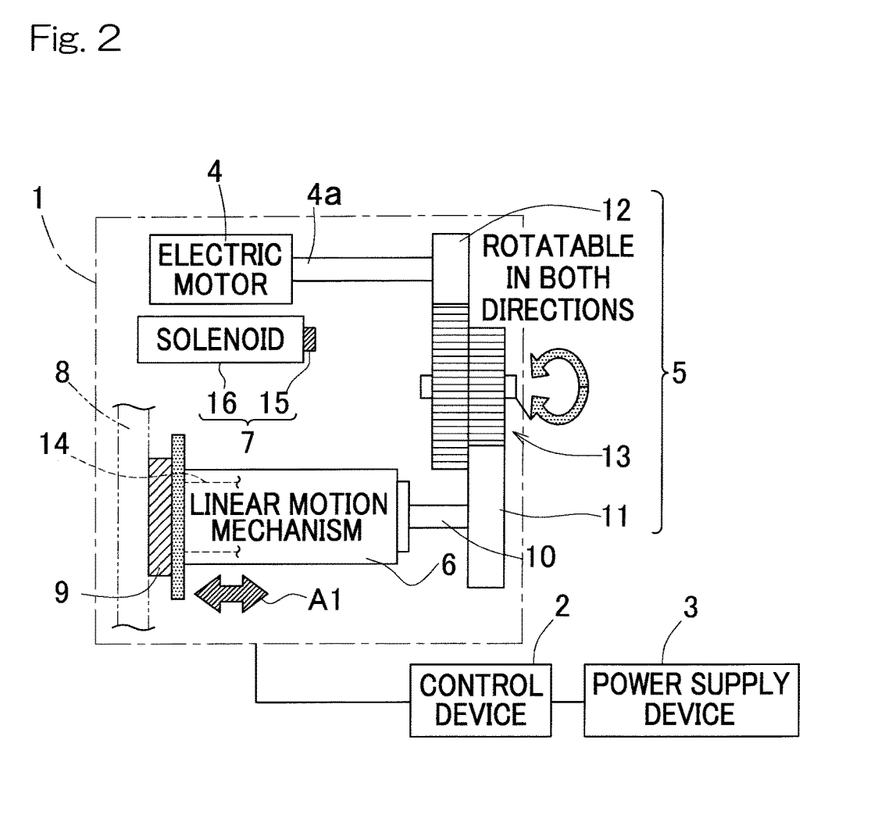
FIG. 2 is a diagram schematically showing one of electric brake devices included in the electric brake system.

As shown in FIG. 2, the electric brake actuator 1 includes an electric motor 4, a speed reduction mechanism or speed reducer 5 that reduces the speed of rotation (number of rotation per unit time) of the electric motor 4, a linear motion mechanism (friction member operator) 6, a parking brake mechanism 7 serving as a parking brake, a brake rotor 8, and a friction member 9. The electric motor 4, the speed reduction mechanism 5, and the linear motion mechanism 6 are incorporated in, for example, a housing (not shown) or the like. The electric motor 4 is constituted by a three-phase synchronous motor or the like.

The speed reduction mechanism 5 reduces the speed of rotation of the electric motor 4 and transmits the rotation to a rotation shaft 10 of the linear motion mechanism 6, and includes a primary gear 12 attached to a rotor shaft 4a of the electric motor 4, an intermediate gear (secondary gear) 13, and a tertiary gear 11 fixed to an end portion of the rotation shaft 10. In this example, the speed reduction mechanism 5 reduces, by the intermediate gear 13, the speed of rotation of the primary gear 12, and allows the rotation to be transmitted to the tertiary gear 11.

The linear motion mechanism 6 serving as the friction member operator converts the rotary motion that is output from the speed reduction mechanism 5 into linear motion of a linear motion portion 14 by using a feed screw mechanism, and brings the friction member 9 into contact with the brake rotor 8 or separates the friction member 9 from the brake rotor 8. The linear motion portion 14 is supported so as to be prevented from rotating and be movable in an axial direction indicated by an arrow A1. The friction member 9 is provided at an outboard-side end of the linear motion portion 14. As a result of rotation of the electric motor 4 being transmitted to the linear motion mechanism 6 through the speed reduction mechanism 5, the rotary motion is converted into the linear motion, which is then converted into a pressing force of the friction member 9, thereby generating a braking force. Here, a side of each of the electric brake devices FL, FR, RL, and RR (FIG. 1) that is located on the outer side of a vehicle when each device is mounted to the vehicle is referred to as "outboard side", and a side thereof located on the center side of the vehicle is referred to as "inboard side".

For example, a linear solenoid is adopted as an actuator 16 of the parking brake mechanism 7. The parking brake mechanism 7 moves a lock member (solenoid pin) 15 forward by the actuator 16, and causes the lock member 15 to be fitted into a locking hole (not shown) formed on the intermediate gear 13 so as to be engaged with the locking hole, thereby preventing the intermediate gear 13 from rotating. Thus, the parking brake mechanism 7 enters a parking lock state. The parking brake mechanism 7 causes the lock member 15 to be removed from the locking hole, thereby allowing the intermediate gear 13 to rotate. Thus, the parking brake mechanism 7 enters an unlock state.

As shown in FIG. 1, to the control devices 2 of the respective electric brake devices FL, FR, RL, and RR, the main power supply device 3 and the host ECU 17 serving as host control unit of the control devices 2 are connected. Note that the host ECU is also referred to as "VCU". For example, an electric control unit that performs overall control of the vehicle is adopted as the host ECU 17. The host ECU 17 has the function of performing integrated control of the electric brake devices FL, FR, RL, and RR. The main power supply device 3 supplies power to the electric motor 4 (FIG. 2) and the control device 2 included in each of the electric brake devices FL, FR, RL, and RR. For example, a 12-V battery mounted to the vehicle is used as the power supply device 3.

Figure 3:
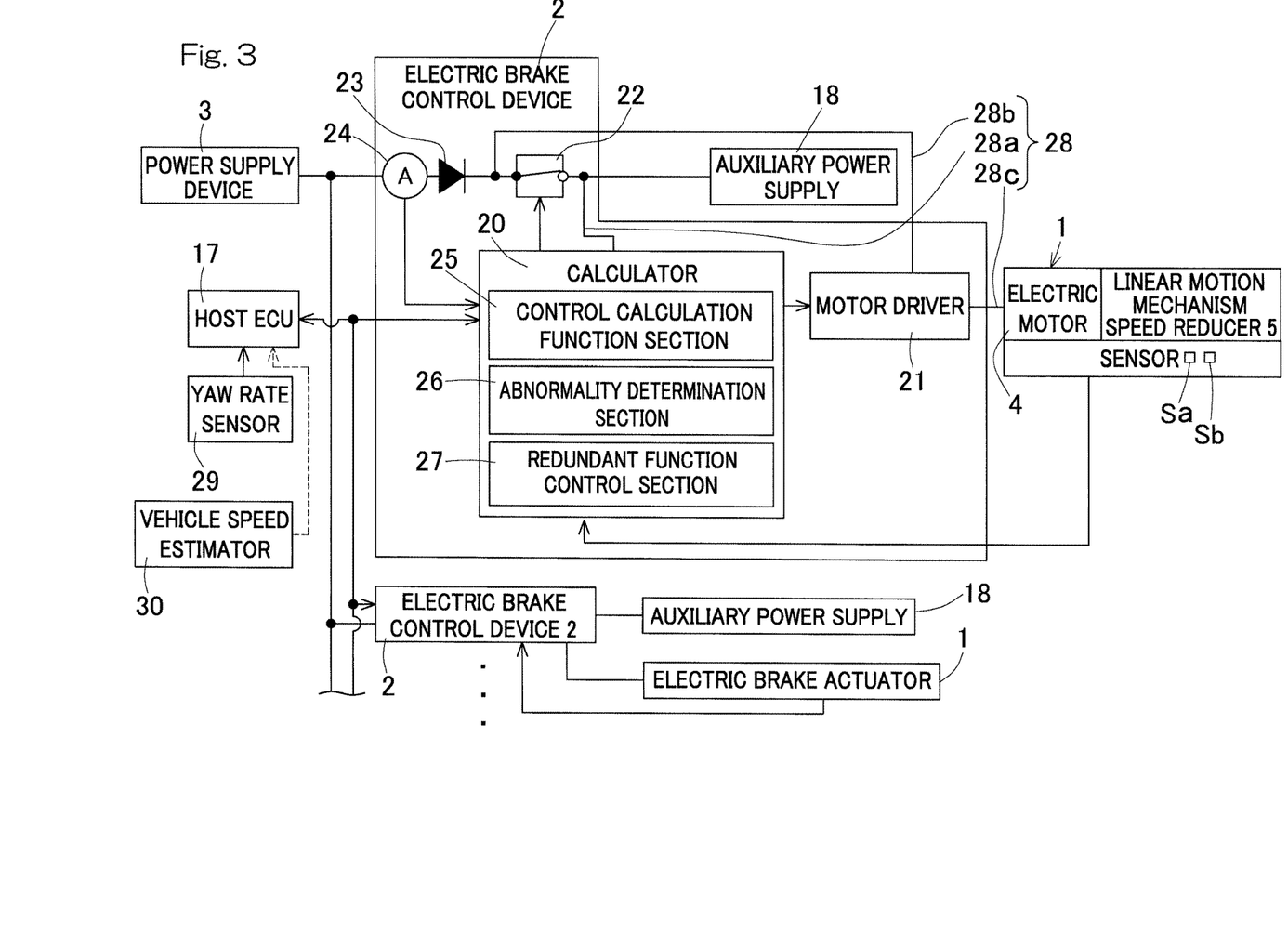
FIG. 3 is a block diagram showing a control system of the electric brake system.

FIG. 3 is a block diagram of a control system of the electric brake system. In response to an output from a sensor (not shown) that varies according to, for example, an operation amount (required value of braking force) of a brake pedal 19 (FIG. 1) operated by the operator of the vehicle, the host ECU 17 outputs a braking force target value to each of the control devices 2 of the electric brake devices by using a LUT (Look Up Table) implemented by software or hardware, or a predetermined transform function contained in a library of software or its hardware equivalent, etc., (hereinafter referred to as "implementation model"). The distribution ratio of the braking force target values to the respective electric brake devices may be, for example, a fixed ratio, or a variable ratio based on motion and/or attitude of the vehicle that are estimated from information from on-vehicle sensors such as an acceleration sensor and specifications of the vehicle equipped with the electric brake devices.

Each of the control devices 2 includes a calculator 20, a motor driver 21, a switch 22, an anti-backflow mechanism section 23, and a current sensor 24. For example, the calculator 20 is a processor such as a microcomputer, or a hardware module such as an ASIC. The calculator 20 includes a control calculation function section 25, an abnormality determination section 26, and a redundant function control section 27.

Among them, the control calculation function section 25 controls the electric motor 4 via the motor driver 21 so as to provide an appropriate braking force, on the basis of the braking force target value from the host ECU 17 and sensing information from the electric brake actuator 1. Specifically, the control calculation function section 25 is configured by a hardware circuit or a software function on a processor (not shown) capable of, in response to an input of the braking force target value, sensing information and the like, calculating an instruction to the motor driver 21, such as an on/off command to a switching element described later, and outputting the instruction by using the above-described implementation model, or a comparison function or its hardware equivalent, etc. The motor driver 21 converts the DC power of the power supply device 3 into a three-phase AC power used for driving the electric motor 4. For example, the motor driver 21 may be a half-bridge circuit or a full-bridge circuit in which a switching element such as a FET (field effect transistor) or an IGBT (insulated gate bipolar transistor), a snubber capacitor or the like is used.

Examples of the sensing information include: a motor current value detected by a current detector Sa; and a rotor angle of the motor 4 that is estimated by rotation angle an estimator Sb. For example, the current detector Sa may be a current sensor, or may estimate the motor current value from motor specifications such as previously measured inductance value, resistance value, or the like, and a motor voltage. For example, the rotation angle estimator Sb may be an angle sensor such as a magnetic encoder or a resolver, or may estimate a motor angle from the aforementioned motor specifications and a motor voltage by using physical equations.

The abnormality determination section 26 of the calculation section 20 determines whether there is abnormality in supply of power from the power supply device 3 to the electric brake device. The abnormality determination section 26 determines not only abnormality of the power supply device itself but also abnormality such as breakage of a power supply harness extending from the power supply device 3. The current sensor 24 is provided on the upstream side in the power supply direction of a power line extending from the main power supply device 3 to each of the control devices 2. Power lines 28 are respectively provided in a first path 28a extending from the power supply device 3 through the current sensor 24, the anti-backflow mechanism section 23, and the switch 22 to the calculator 20 and the auxiliary power supply 18, a second path 28b extending from a position between the anti-backflow mechanism section 23 and the switch 22 to the motor driver 21, and a third path 28c extending from the motor driver 21 to the electric motor 4.

For example, a diode can be used as the anti-backflow mechanism section 23 which is provided in order to use regenerated power of the electric motor 4 to charge the auxiliary power supply 18 without returning the regenerated power to the power supply device 3. When the abnormality determination section 26 determines that there is no abnormality, the calculator 20 can supply the regenerated power of the electric motor 4 to the auxiliary power supply 18 by keeping the switch 22 on. For example, the abnormality determination section 26 turns the switch 22 off when determining whether there is abnormality in supply of power. Then, in this switch-off state, the abnormality determination section 26 performs the determination, for example, by comparing the current value detected by the current sensor 24 with a threshold stored in storage portion (not shown) included in the calculator 20. That is, specifically, the abnormality determination section 26 is configured by a hardware circuit or a software function on a processor (not shown) capable of, in response to an input of the current value detected by the current sensor 24, performing the power supply abnormality determination described above and outputting a result of the determination including opening and closing instructions to the switch 22, by using the above-described implementation model, or a comparison function or its hardware equivalent, etc.

When the abnormality determination section 26 has determined that there is abnormality in supply of power from the power supply device 3 to the electric brake device, the redundant function control section 27 controls the braking force by using the auxiliary power supply 18 in accordance with a predetermined condition. The redundant function control section 27 controls the braking force by using the auxiliary power supply 18 in accordance with, as the predetermined condition, a basic condition that at least a desired braking force cannot be output even with all the electric brake devices for which the abnormality determination section 26 has determined that there is no abnormality in supply of power. In this case, all the other electric brake devices for which there is no abnormality in supply of power transmit their own operating states to the electric brake device for which the abnormality determination section 26 has determined that there is abnormality in supply of power. The sensing information can be used as the operating state.

The calculator 20 of the electric brake device to which the sensing information has been transmitted and for which there is abnormality in supply of power determines, by the redundant function control section 27 of the calculator 20, whether or not to operate this electric brake device by using the auxiliary power supply 18. In this case, the redundant function control section 27 may determine whether or not to use the power from the auxiliary power supply 18 while observing the state of the function of the electric brake system as a whole from the operating states of all the other electric brake devices. For example, a capacitor or a battery smaller than a battery commonly used for a vehicle may be adopted as the auxiliary power supply 18.

Figure 4:
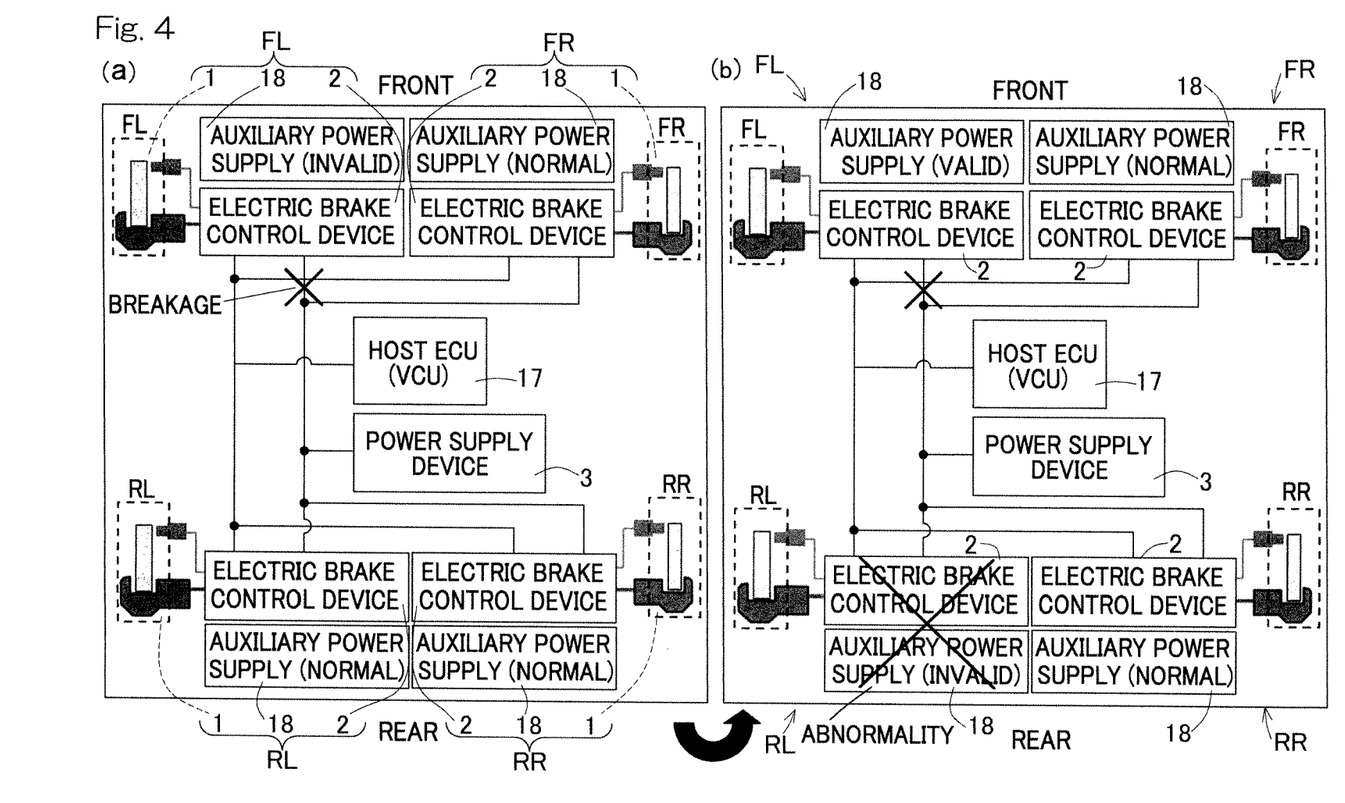
FIG. 4 is a diagram showing a usage example of an auxiliary power supply of the electric brake system.

FIG. 4 is a diagram showing a usage example of the auxiliary power supply 18 of the electric brake system. Hereinafter, a description will be given also with reference to FIG. 3 as needed. In the statements within the auxiliary power supply 18 in FIG. 4, "normal" indicates a state in which the auxiliary power supply 18 is connected to the power supply device 3, "invalid" indicates a state in which the auxiliary power supply 18 is disconnected from the electric motor 4 (FIG. 3) without being connected to the power supply device 3 (the state in which the switch 22 in FIG. 3 is off), and "valid" indicates a state in which the power supply device 3 is not connected, and the auxiliary power supply 18 is connected (the state in which the switch 22 in FIG. 3 is turned on). The "invalid" and the "valid" indicate that there is abnormality in supply of power, the electric brake, or the like.

Referring to chart (a) of FIG. 4, a power supply harness connected from the power supply device 3 to a part of the electric brake devices, in this embodiment, the electric brake device FL (corresponding to the left-front wheel in this example) has been broken, and the abnormality determination section 26 determines that abnormality has occurred in supply of power, on the basis of the current value detected from the current sensor 24. However, at this stage, a predetermined braking force can be output by using the electric brake devices FR, RL, and RR corresponding to the other wheels (in this example, the right-front wheel, and the left- and right-rear wheels). Therefore, the redundant function control section 27 of the electric brake device FL in which abnormality has occurred does not use the auxiliary power supply 18.

As shown in chart (b) of FIG. 4, in the case where abnormality has occurred in, for example, the calculator 20 for another electric brake device RL (corresponding to the left-rear wheel in this example), following the state shown in chart (a) of FIG. 4, the sensing information indicating the operating state of the electric brake device RL and the sensing information of the other normal electric brake devices FR and RR are transmitted to the above-mentioned part of the electric brake devices, in this embodiment, the electric brake device FL. In this case, braking is performed by using only the normal electric brake devices FR and RR, so that a turning acceleration for a right-hand turn in the drawing inevitably occurs. Therefore, the redundant function control section 27 of the electric brake device FL corresponding to the left-front wheel determines to use the auxiliary power supply 18 of the electric brake device FL, and makes the auxiliary power supply 18 "valid", thereby performing braking using the three electric brake devices FL, FR, and RR.

In the state shown in chart (a) of FIG. 4 in which the power line 28 connected to the electric brake device FL corresponding to the left-front wheel has been merely broken, if the braking force required by the operator of the vehicle is increased, for example, when the brake pedal 19 (FIG. 1) is strongly depressed, a sufficient braking force may not be provided by only the right-front wheel FR and the left- and right-rear wheels RL, RR. Therefore, at least, the redundant function control section 27 of the electric brake device FL in which abnormality has occurred makes the auxiliary power supply 18 valid so as to cause the electric brake device FL to generate a braking force such that the turning acceleration of the vehicle is less than or equal to a predetermined value (for example, when the turning acceleration of the vehicle has exceeded a predetermined value), in addition to satisfying that the basic condition that the desired braking force cannot be output even with all the electric brake devices for which the abnormality determination section 26 has determined that there is no abnormality in supply of power, in other words, the basic condition that the deceleration in the front-rear direction caused by the electric brake devices FR, RL, and RR of the right-front wheel, and the left- and right-rear wheels for which it is determined that there is no abnormality is less than or equal to a threshold.

At this time, the respective decelerations in the front-rear direction are calculated by the respective calculators 20 on the basis of the sensing information of the corresponding electric brake devices FR, RL, and RR, and then transmitted via the host ECU 17 to the calculator 20 of the electric brake device FL that is the target to be controlled. The redundant function control section 27 of the calculator 20 that has received the transmission may determine whether or not to make the auxiliary power supply 18 valid by using a threshold that is variable depending on the braking force such that the auxiliary power supply 18 of the electric brake device FL is made valid in such a case where the required braking force is increased. A correlation in which the threshold of deceleration in the front-rear direction increases with an increase in the value of the braking force required by the operator of the vehicle is stored, for example, in the storage portion (not shown) of the calculator 20. The redundant function control section 27 may change the threshold of deceleration in the front-rear direction on the basis of the correlation stored in the storage portion. By changing the threshold of deceleration in the front-rear direction in this manner, the frequency of use of the auxiliary power supply 18 can be limited.

Specifically, the redundant function control section 27 described thus far is configured by a hardware circuit or a software function on a processor (not shown) capable of, in response to a result of the abnormality determination performed by the abnormality determination section 26, determining whether or not to operate the electric brake device by using the auxiliary power supply 18 and of operating the auxiliary power supply 18 on the basis of the result by using the above-described implementation model, or a comparison function or its hardware equivalent, etc. Specifically, the redundant function control section 27 further includes a hardware circuit or a software function on a processor (not shown) capable of changing the threshold of deceleration in the front-rear direction on the basis of the correlation by using the above-described implementation model, or a comparison function or its hardware equivalent, etc.

Figure 5:
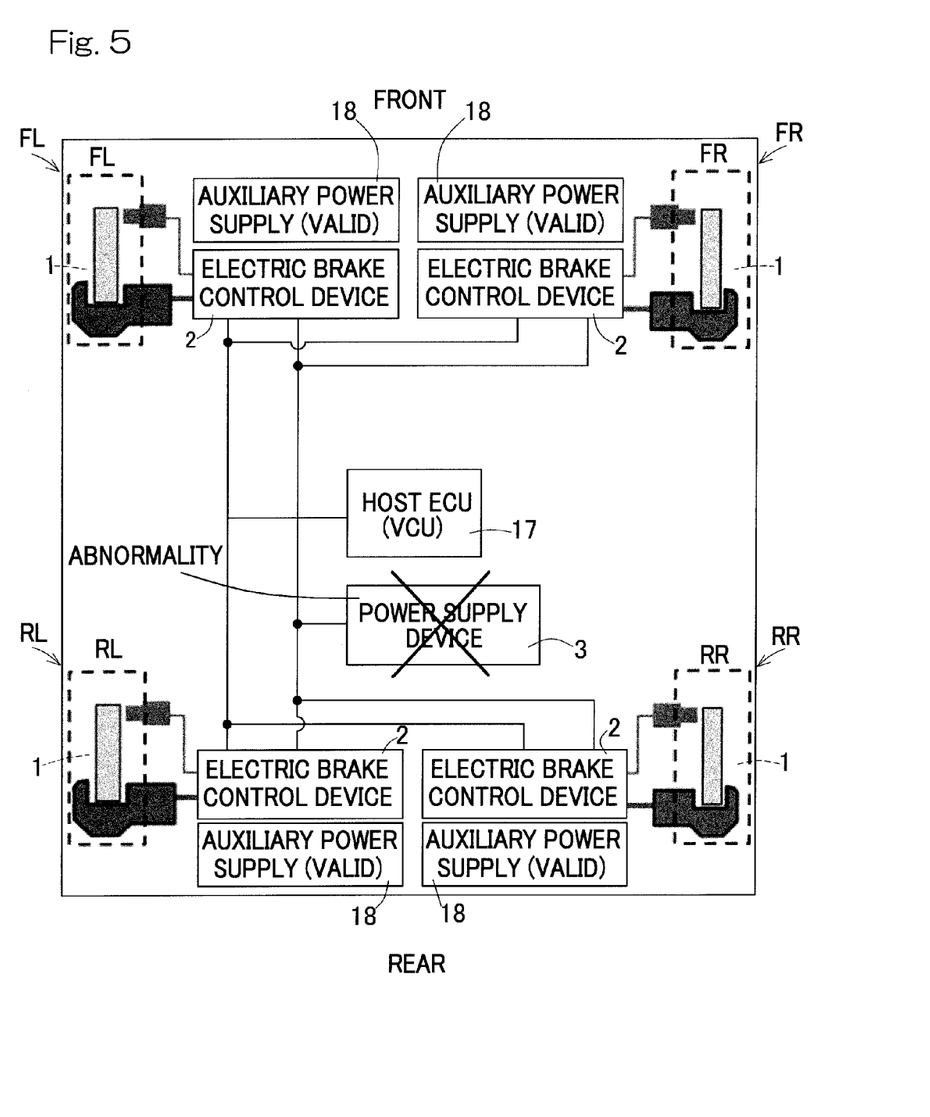
FIG. 5 is a diagram showing an example of the electric brake system at time of a main power supply abnormality.

As shown in FIG. 5, all braking force is lost when abnormality occurs in the main power supply device 3. Accordingly, if the abnormality determination section 26 of each of the control devices 2 of the electric brake devices FL, FR, RL, and RR of the four wheels determines that there is abnormality in the power supply device 3, the redundant function control section 27 of each of the control devices 2 immediately makes their own auxiliary power supply 18 valid so as to perform braking according to the required braking force.

Figure 6:
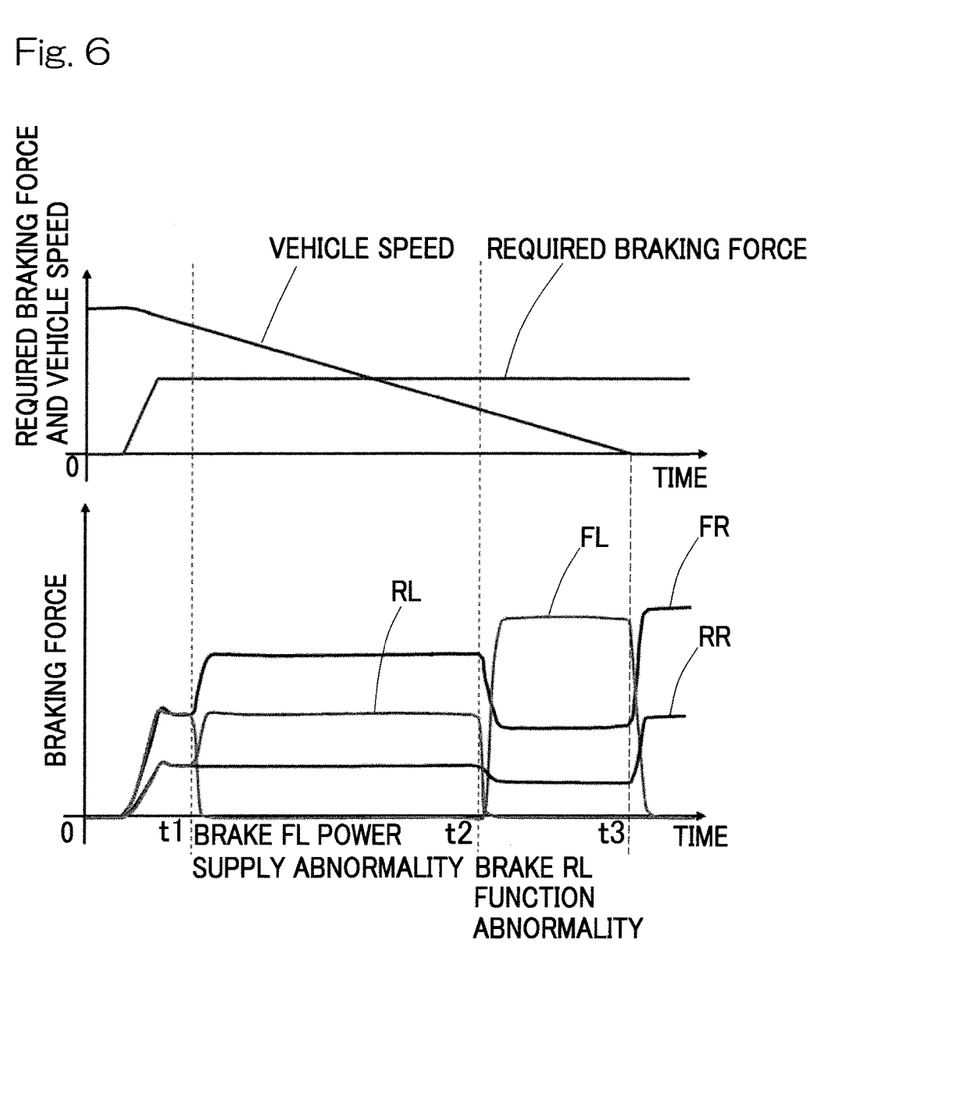
FIG. 6 is a diagram showing an operation example of the electric brake system.

FIG. 6 is a diagram showing an operation example of the electric brake system. The drawing shows an operation example in the examples shown in charts (a) and (b) of FIG. 4. A description will be given also with reference to charts (a) and (b) of FIG. 4 and FIG. 3 as needed. Braking is started by the control calculation function section 25 controlling the electric motor 4 on the basis of the braking force target value corresponding to the required braking force, and the sensing information. It is assumed that power line abnormality such as the above-described harness breakage has thereafter occurred in the electric brake device FL corresponding to the left-front wheel.

At that time, the electric brake device FL can be driven by using the auxiliary power supply 18. However, braking can be performed by using the other electric brake devices FR, RL, and RR to which the power supply system is normally connected, and therefore, the electric brake device FL is not used (time t1 in the drawing). It is preferable that the braking forces of the electric brake devices FR, RL, and RR at this time are determined under a constraint that the yaw rate, which is the turning acceleration that occurs to the vehicle, is less than or equal to a predetermined value. For example, the yaw rate is detected by a yaw rate sensor 29 (FIG. 3).

It is assumed that, for example, abnormality of the calculator 20 has thereafter occurred in the electric brake device RL corresponding to the left-rear wheel. At that time, it is difficult to perform braking only by using the electric brake devices FR and RR in the right column in chart (b) of FIG. 4 as described above, while keeping the yaw rate at a value less than or equal to the predetermined value. Therefore, the auxiliary power supply 18 of the electric brake device FL of the left-front wheel is used to perform braking by using the electric brake devices FL, FR, and RR (time t2). After the vehicle has subsequently stopped, a yaw rate is unlikely to occur except under a condition such as an extreme sloping has occurred. According to this reason, the usage of the electric brake device FL is suspended thereafter in order to conserve the capacity of the auxiliary power supply 18 (time t3), and the stopped state is maintained by the electric brake devices FR and RR in the right column.

Figure 7:
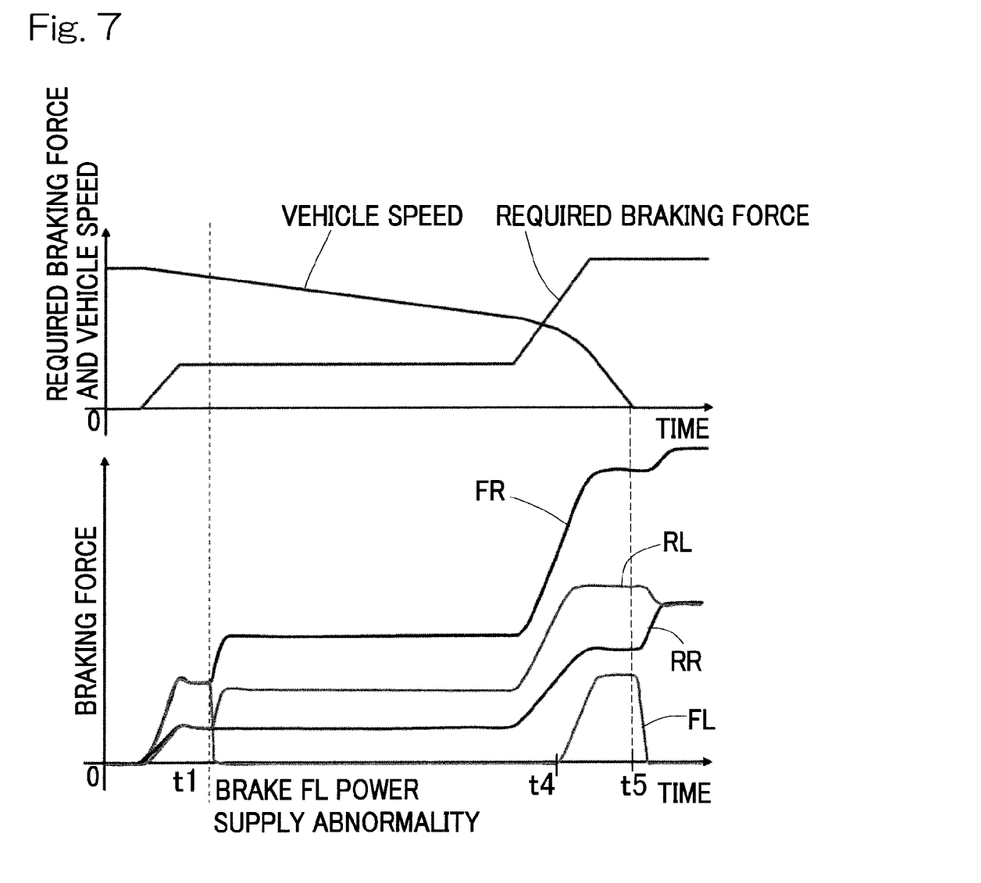
FIG. 7 is a diagram showing another operation example of the electric brake system.

FIG. 7 is a diagram showing another operation example of the electric brake system. FIG. 7 shows an operation example in which a condition that the required braking force is less than or equal to a predetermined value is set in the example shown in chart (a) of FIG. 4. It is assumed that power line abnormality such as the harness breakage has occurred in the electric brake device FL after start of braking. The electric brake system is operated in the same manner as that in FIG. 6 until the occurrence of abnormality.

Thereafter, the required braking force is increased, and when it is determined that a sufficient braking force cannot be provided by only the other electric brake devices FR, RL, and RR, the electric brake device FL is used by using the auxiliary power supply 18 (time t4). At that time, it is possible to achieve a brake balance that can minimize the power required by the electric brake device FL in which abnormality has occurred. After the vehicle has stopped subsequently, the usage of the electric brake device FL is suspended in order to conserve the capacity of the auxiliary power supply 18, and the stopped state is maintained by the other electric brake devices RL, FR, and RR (time t5).

With the electric brake system described thus far, normally, the main power supply device 3 supplies power to the electric motor 4 and the control device 2. The control device 2 controls the electric motor 4 so as to provide an appropriate braking force, on the basis of the braking force target value from the host ECU 17 and the sensing information from the electric brake actuator 1. At this time, power is supplied to and stored in the auxiliary power supply 18 from the main power supply device 3. In addition, the regenerated power of the electric motor 4 may be supplied to the auxiliary power supply 18.

When the abnormality determination section 26 has determined that the supply of power to the electric brake device is abnormal, the redundant function control section 27 controls the braking force by using the auxiliary power supply 18 in accordance with the predetermined condition. When at least a desired braking force cannot be output even with all the electric brake devices for which it is determined that there is no abnormality in supply of power, the redundant function control section 27 controls the braking force by using the auxiliary power supply 18, as the predetermined condition. By providing the auxiliary power supply 18 in the electric brake system in addition to the main power supply device 3 in this manner, it is possible to provide a redundant function for the power supply system.

Furthermore, the use of the auxiliary power supply 18 is limited to a case where the function of the electric brake system as a whole is reduced to a level lower than a predetermined level. Accordingly, a battery smaller than a battery commonly used for a vehicle, or a capacitor can be adopted as the auxiliary power supply 18, for example. Because of the limited use of the auxiliary power supply 18, it is possible to achieve a size reduction for the auxiliary power supply 18, and increase the degree of freedom in the mounting space of the auxiliary power supply 18 to the vehicle. Consequently, it is possible to increase the degree of freedom in design.

Another embodiment will now be described. In the following description, the components corresponding to the matters described in each of the preceding embodiments are denoted by like reference numerals, and any redundant description has been omitted. When only a part of a configuration is described, the other part of the configuration is the same as described in the preceding description unless otherwise specified. The same operation and effect can be obtained from the same configuration. A combination of parts that are specifically described in the embodiments can be implemented, and, further, the embodiments may be partially combined unless such combinations cause any problem.

Figure 8:
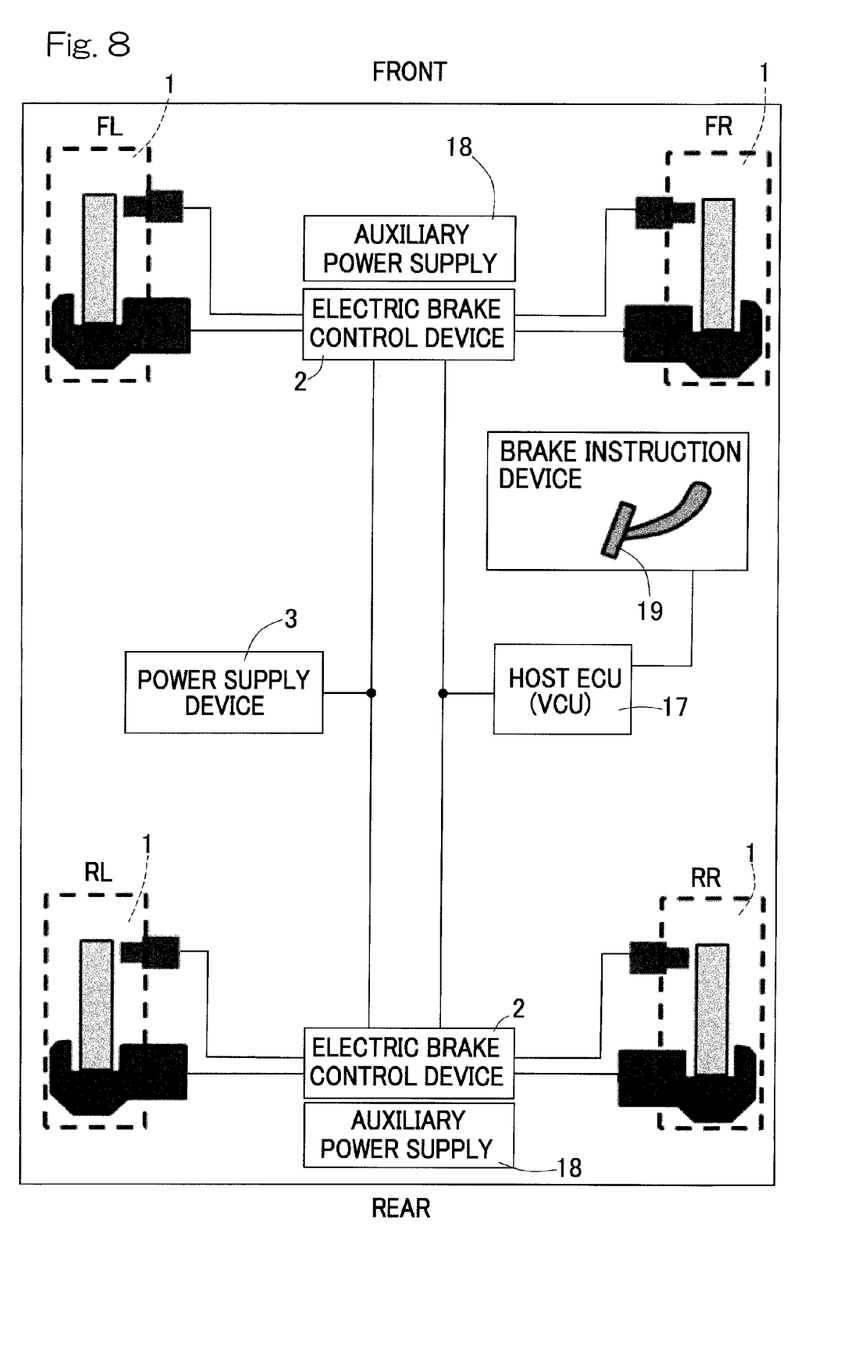
FIG. 8 is a diagram showing, in plan view, a configuration example in which an electric brake system according to another embodiment of the present invention is mounted to a vehicle.

As shown in FIG. 8, one control device 2 and one auxiliary power supply 18 may be provided for two electric brake actuators 1, 1 corresponding to the left- and right-front wheels, and one control device 2 and one auxiliary power supply 18 may be provided for two electric brake actuators 1, 1 corresponding to the left- and right-rear wheels.

Although both of the configurations in FIG. 1 and FIG. 8 show an example in which the auxiliary power supply 18 is provided in all the electric brake devices, the auxiliary power supply 18 may be provided only some of the electric brake devices. For example, generally, the front brake generally exerts a braking force that is twice the braking force exerted by the rear brake in a four-wheeled automobile. Therefore, the auxiliary power supply 18 may be provided only in the front electric brake device so as to achieve redundancy.

At the time of determining whether there is abnormality in supply of power from the power supply device 3 to the electric brake device, the supply state of power may be monitored by the host ECU 17 without using the current sensor 24, and the information being monitored may be transmitted to the calculator 20. In this case, the abnormality determination section 26 of the calculator 20 may determine whether there is abnormality in supply of power by checking the information provided from the host ECU 17 against a predetermined relation stored in the storage portion or the like.

For example, no turning acceleration occurs to a vehicle in the stopped state. Therefore, the auxiliary power supply 18 may be used only when the vehicle speed is greater than or equal to a predetermined vehicle speed. Specifically, as shown in FIG. 3, the vehicle speed estimator 30 that estimates a traveling speed of a vehicle equipped with the electric brake system may be provided, and the redundant function control section 27 may use the auxiliary power supply 18 when a condition that the vehicle speed estimated by the vehicle speed estimator 30 is greater than or equal to a predetermined vehicle speed is satisfied as the predetermined condition. Alternatively, it is possible to use a process, for example, in which an electric brake device on the front side having a braking force larger than that of the electric brake device on the rear side is used preferentially.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . control device
3 . . . power supply device
4 . . . electric motor
6 . . . linear motion mechanism (friction member operator)
8 . . . brake rotor
9 . . . friction member
18 . . . auxiliary power supply
26 . . . abnormality determination section
27 . . . redundant function control section
30 . . . vehicle speed estimator
FL . . . (front-left) electric brake device
FR . . . (front-right) electric brake device
RL . . . (rear-left) electric brake device
RR . . . (rear-right) electric brake device

What is claimed is:

1. An electric brake system comprising a plurality of electric brake devices, the electric brake devices each including a brake rotor, a friction member that is to be brought into contact with the brake rotor, a friction member operator configured to bring the friction member into contact with the brake rotor, an electric motor that drives the friction member operator, and a control device that controls a braking force by controlling the electric motor, wherein a main power supply device that supplies power to the respective electric motors and the respective control devices included in the electric brake devices is provided, and each of the electric brake devices is provided with an auxiliary power supply that stores therein power supplied from the main power supply device and supplementarily supplies power to at least the electric motor of the electric brake device, each of the control devices of the electric brake devices includes:

an abnormality determination section that determines whether there is abnormality in supply of power from the power supply device to the electric brake device; and a redundant function control section that, when the abnormality determination section has determined that there is abnormality in supply of power from the power supply device to the electric brake device, controls the braking force by using the auxiliary power supply in accordance with a predetermined condition, the redundant function control section controls the braking force by using the auxiliary power supply when at least a basic condition is satisfied as the predetermined condition, the basis condition being a condition that a desired braking force cannot be output even with all the electric brake devices for which the abnormality determination section has determined that there is no abnormality in supply of power.

2. The electric brake system as claimed in claim 1, wherein the redundant function control section uses the auxiliary power supply such that, in addition to that the basic condition is satisfied, a turning acceleration of a vehicle equipped with the electric brake system is less than or equal to a predetermined value, as the predetermined condition.

3. The electric brake system as claimed in claim 2, wherein the redundant function control section changes a threshold of deceleration in a front-rear direction on the basis of a correlation in which the threshold of deceleration in the front-rear direction increases with an increase in a value of a braking force required by an operator of the vehicle.

4. The electric brake system as claimed in claim 1, wherein a vehicle speed estimator configured to estimate a traveling speed of a vehicle equipped with the electric brake system is provided, and the redundant function control section uses the auxiliary power supply when, in addition to that the basic condition is satisfied, a condition that the vehicle speed estimated by the vehicle speed estimator is greater than or equal to a predetermined vehicle speed is satisfied as the predetermined condition.

5. The electric brake system as claimed in claim 1, wherein the redundant function control section of the electric brake device for which it is determined that there is abnormality in supply of power determines whether or not to use power of the auxiliary power supply, on the basis of sensing information of all the electric brake devices for which there is no abnormality in supply of power.

* * * * *